United States Patent
Pflügl et al.

(10) Patent No.: US 7,444,190 B2
(45) Date of Patent: Oct. 28, 2008

(54) METHOD FOR CREATING A NON-LINEAR, STATIONARY OR DYNAMIC MODEL OF A CONTROL VARIABLE OF A MACHINE

(75) Inventors: Horst Pflügl, Lannach (AT); Stefan Jakubek, Vienna (AT); Kurt Gschweitl, Eggersdorf (AT)

(73) Assignee: AVL List GmbH, Graz (AT)

( * ) Notice: Subject to any disclaimer, the term of this patent is extended or adjusted under 35 U.S.C. 154(b) by 296 days.

(21) Appl. No.: 11/168,989

(22) Filed: Jun. 29, 2005

(65) Prior Publication Data
US 2006/0052991 A1    Mar. 9, 2006

(30) Foreign Application Priority Data
Jun. 30, 2004    (AT) ............................... 459/2004 U

(51) Int. Cl.
*G06F 17/50* (2006.01)
*G06G 7/62* (2006.01)
*G05B 13/02* (2006.01)

(52) U.S. Cl. ........................ 700/28; 700/29; 700/31; 700/47; 700/48; 700/49; 700/50; 700/52; 703/13

(58) Field of Classification Search ............ 700/28–29, 700/31, 47–50, 52; 703/13
See application file for complete search history.

(56) References Cited
U.S. PATENT DOCUMENTS
7,212,915 B2    5/2007    Dudek

OTHER PUBLICATIONS

O. Nelles et al., "Comparison of Two Construction Algorithms for Takagi-Sugeno Fuzzy Models," 7th European Congress on Intelligent Techniques and Soft Computing, EUFIT'99, Hachen, Germany, Sep. 13-16, 1999.
O. Nelles et al., "Local Linear Model Trees (Lolimot) Toolbox for Nonlinear System Identification," 12th IFAC Symposium on System Identification (SYSID 2000), Jun. 21-23, 2000, Santa Barbara, CA.

*Primary Examiner*—Ronald D Hartman, Jr.
(74) *Attorney, Agent, or Firm*—Dykema Gossett PLLC

(57) ABSTRACT

A method for creating a non-linear, stationary or dynamic overall model of a control variable of a combustion engine or partial systems thereof is based on simplified partial model functions that are used to determine in a weighted fashion at each desired operating point the total output quantities from the partial model function with an associated weighting function. The difference between the total output quantity and the real value is determined for all real operating points; and in areas of operating points with an absolute value of this difference that is above the preset value, a further model function with a further associated weighting function is used for which the absolute value of the difference stays below the preset value.

The steps for determining the difference between the total output quantity of the associated partial model functions and a real value of the control value as well as the application of a further model and weighting function are executed as many times as needed until the statistically evaluated prediction quality of the overall model has reached a desired value.

10 Claims, 10 Drawing Sheets

METHOD FOR CREATING A NON-LINEAR, STATIONARY OR DYNAMIC MODEL OF A CONTROL VARIABLE OF A MACHINE

BACKGROUND OF THE INVENTION

The invention relates to a method for creating a non-linear, stationary or dynamic model of a control variable of a machine, in particular of a combustion engine or of a partial system thereof, preferably using neuronal nets, over the total area of all operating points of the machine, and whereby the control variable is dependent on a set of input quantities, for example system parameters, system parameters differentiated by time, time-delayed output quantities with feedback and/or preset values at the respective operating point, and whereby for a group of real operating points from the total area of operating points of the machine using a simplified partial model function for this group one output quantity is determined per model function, and the output quantities of each partial model function are added at any operating point in a weighted fashion to an associated weighting function to obtain a total output quantity for the respective operating point, and whereby for all real operating points the difference respectively between the total output quantity and the real value of the control value is determined at this operating point, and in areas of operating points with an absolute value of the difference lying above a preset value a further model function with a further associated weighting function is used for which the absolute value of the difference stays below the preset value.

THE PRIOR ART

Models of real processes are of fundamental importance in almost all areas of research. Models of systems or processes are needed for a multitude of applications such as for predicting or simulating the behavior of a system, acquiring a better understanding of a system, improving or optimizing an existing process or design of a new system or, in addition, for creating regulators as well as for arriving at an error diagnosis and control systems for real systems based on process models.

The modeling and identification of non-linear systems is very sophisticated because non-linear systems can have the property of having infinite structural variety in comparison to linear systems. A principal requirement of an algorithm for identifying non-linear systems is therefore the ability to describe a multitude of structurally different systems. In contrast to very specialized approaches to solutions where the structure of the non-linearity is more or less preset in a fixed manner, local model trees are able to handle a large number of non-linear systems and can therefore also be used for applications that demand a high level of flexibility.

The basic principle of neuro-fuzzy models was developed more or less independently in several disciplines such as neuronal nets, fuzzy logic, statistics and artificial intelligence; specifically under the most varied names such as local model nets, Takagi-Sugeno fuzzy models or local models. The model architecture of the linear neuro-fuzzy partial models represents an excellent approach for integrating several sources of knowledge because they can easily be interpreted. The neuro-fuzzy model interpolates local models that are valid in different operating areas respectively.

The "local linear model tree, LOLIMOT" is a new development. It is based on the idea of an approximation of a non-linearity by piecewise-linear partial models. This algorithm has an outer loop, that establishes the ranges of validity of the partial models, and an inner loop, that determines the parameters of these partial models. There is no strict separation between areas in which linear models are valid; instead the delimitations are blurred, i.e. the linear partial models are combined by suitable weight functions, so-called validity functions. Gaussian distribution functions are normally used for this purpose. The parameters of the linear partial models are determined using the method of the smallest square of error having clear advantages in contrast to a global parameter estimation. The non-linear model parameters, i.e. the number of and the parameters of the weighting functions are determined by an iterative construction algorithm in order to avoid the use of non-linear optimization techniques.

One of the main strengths of local model trees lies in the fact that the premise (i.e. weighting function) and the effect (i.e. linear partial model) do not have to be dependent on identical variables. This allows avoiding the "curse of dimensionality" by incorporating pre-existing knowledge of the process. Another advantage of local model trees is the fact that they were designed to automatically adjust in a highly efficient manner to the complexity of the problem. Those areas of the input space, in which the structure of the non-linearity is complex, are subdivided in many partial areas so that they can be adequately represented by partial models.

The LOLIMOT algorithm was conceived in such a way that it systematically halves areas of the input space. Partial models that do not fit adequately are thus replaced by two or several smaller models with the expectation that the latter will be better suited to represent the non-linear target function in their range of validity. The main disadvantage of this process is that this strategy it) more or less based on trial and error thereby triggering much unnecessary processing power. Moreover, the area subdivisions are axis-orthogonal, which is why the requirements are often not met by the structure of the non-linearity. The data quantity for the model formation is limited in most practical applications, and the distribution in the input area is minimal. This is the cause for a limitation of the tree construction algorithm resulting in the fact that many partial models are created while fewer would have been adequate. This problem was recently addressed by fuzzy clustering; nevertheless, the algorithm continues to be limited to orthogonal subdivision.

The object of the present invention was therefore to describe a method as outlined in the introduction that arrives more quickly, i.e. with fewer iterations, at an optimal overall model for the control variable of a machine, in particular of a combustion engine or of a partial system thereof, meeting a statistically substantiated prediction quality so that in the end an overall model is available with very good statistical prediction quality requiring the lowest possible number of partial models. This is intended to make the optimal determination of the control variable of the machine possible, even for the operating points that were not measured.

SUMMARY OF THE INVENTION

To achieve this object, it is envisioned according to the invention that the steps for establishing the difference between the total output variable of the associated partial model functions and a real value of the control variable at this real operating point as well as the application of a further model function and further weighting function are executed as often as it takes until the statistically evaluated prediction quality of the overall model has reached a desired value.

Preferably, the optimal creation of an overall model is promoted during this process when the, respectively, most recent step is reversed and the run-through is terminated once the statistically evaluated prediction quality begins to deteriorate again.

According to another embodied example of the method according to the invention, it is envisioned that each weighting function is a radial-symmetric function (hyper-ellipsoid) in the n-dimensional space of the operating points, and whereby the iso-curves of the weighting function represent a closed geometric construct in the space of the operating points, and each iso-curve with weighed values of a defined delimitation, preferably of 90% of the maximum value of the weighting function, geometrically encloses a group of real operating points. This improves model formation in contrast to methods with axis-orthogonal subdivision in that by allowing any orientation and expansion of the model functions a better approximation to the operating points becomes possible.

The iso-curve of the weighting function in this is preferably a hyper-ellipsoid in the n-dimensional space whose main axes have principally any orientation in the space of the operating points in relation to the system of coordinates.

The best transition between the local partial models can be achieved when the weighting function is an exponential function of at least one input quantity at the respective operating point.

A preferred variant of the method envisions that a first weighting function is provided whose iso-curve of a defined weighted value geometrically encloses all real operating points.

Advantageously, based on the operating point with the largest absolute value of the difference between total output quantity of the model and actual value of the control variable, further points for the next partial model are determined and the, further weighting function placed in its center. The partial models are consequently placed one after the other in those regions of the input space where the model error is big in order to ensure a maximum improvement with each further partial model.

According to a preferred variant of the described method, it is envisioned that the number of the real operating points within the iso-curve of a defined weighted value of the weighting function is larger than the number of regressors, preferably larger by at least a factor 1.05. With these measures, the orientation and expansion of each partial model is optimally adjusted to the available training data, with maximum statistical correspondence to the measured data as well as to the signal/noise ratio thereby making the determination of the local regression parameters an well conditioned problem.

Preferably, when the number of the regressors within the closed iso-curve of a defined weighted value of the weighting function drops below the number of input quantities multiplied by a factor, preferably below the number multiplied by a factor of 1.05, this partial model and associated weighting function are removed from the overall model.

With the method according to the invention the error of the model function within the defined iso-curves of each weighting function is held advantageously at below 10%.

The high efficiency of the method according to the invention leads to a considerably better result accompanied at the same time by a lower computing effort, fewer partial models and a generally better confidence interval. Aside from creating a model for a non-linear process, the neuronal net presented here is able to deliver information as to its accuracy in the form of confidence intervals.

Subsequently, the invention shall be described in more detail using examples and the enclosed figures in the drawings.

DETAILED DESCRIPTION OF PREFERRED EMBODIMENT

Figure 1:
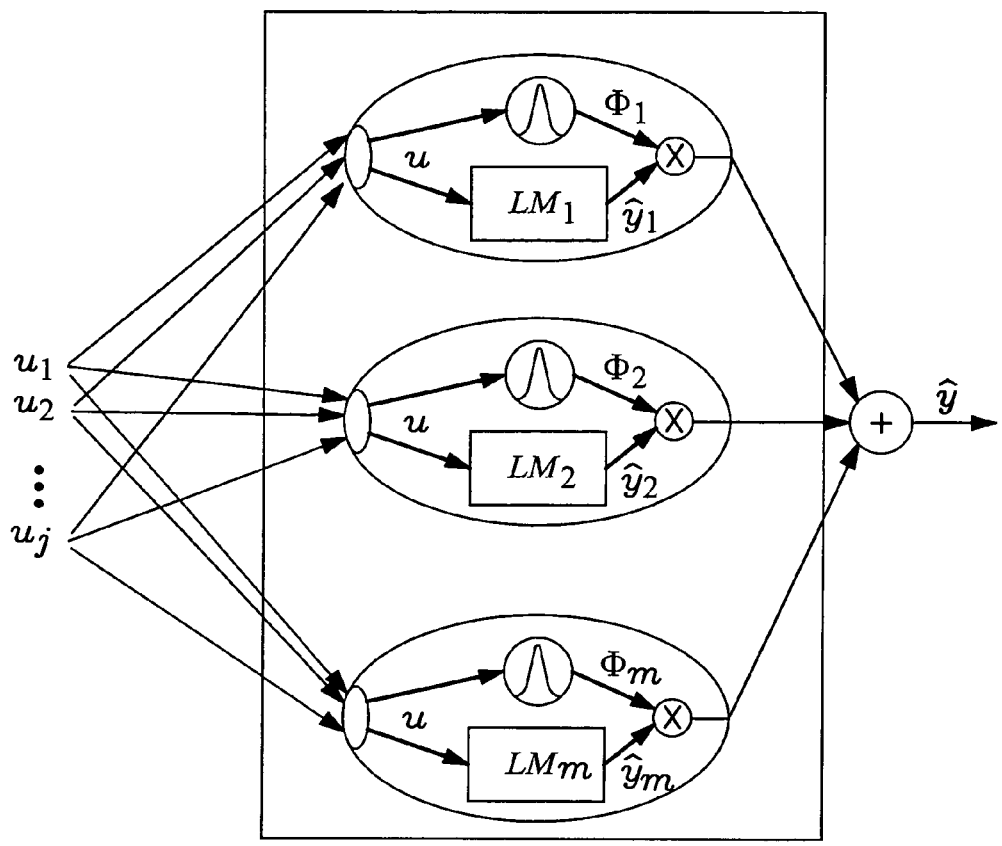
FIG. 1 shows a schematic setup of a local model tree.

FIG. 1 shows the setup of a local model tree. Each partial model (designated as $LM_i$) uses the input vector $u=[u_1 \cdot u_2 \ldots u_q]^T$ to calculate its associated weighting function $\Phi_i$ and its partial output value $\hat{y}_i$ of the non-linear target function $f(u)$. The total network output value is the sum of all weighted partial output values $\hat{y}_i$: (equation 4). Here, $\theta_i$ is a vector with the parameters of the partial models, and the partial models are created with u and $\theta_i$. The model is static if the input vector is comprised of stationary variables and becomes dynamic if one or several of the input variables either represents the temporal derivation of a system variable or is the feedback of the output quantity delayed by one br several scanning steps of a time-discrete system.

The total quality of the net output is determined by two different model grade criteria. Used as first model grade criteria for n training data points and their respective result values, the associated net outputs and the mean value of all $y_i$ are the certainty measure $R^2$ which represents a relation of declared dispersion relative to total dispersion of the measured data in comparison to the model:

$$R^2 = 1 - \frac{\sum_{i=1}^{n} (y_i - \hat{y}_i)^2}{\sum_{i=1}^{n} (y_i - \bar{y}_i)^2} \quad (1)$$

It describes the relative accuracy of the model calculated with the given training data points. The maximum value of $R^2$ is 1, which means that the model provides a perfect imitation of all training data. $R^2$ is a suitable model grade value for noise-free training data; but if there is measuring noise, optimizing $R^2$ can easily lead to over-fitting. In this case, the $R^2_{pred}$ statistic serves as the better criterium:

$$R^2_{pred} = 1 - \frac{\sum_{i=1}^{n}(y_i - \hat{y}_{i,-i})^2}{\sum_{i=1}^{n}(y_i - \tilde{y})^2} \quad (2)$$

In present instance, $\hat{y}_{i,-i}$ is the output value of the training data point no. i of a net that is modeled without the use of the training data point no. i. By way of the above, the $R^2_{pred}$ statistic describes the prediction accuracy of the model. But other parameters are, in principle, also possible for the determination of the statistically evaluated prediction quality.

The tree model algorithm is comprised of an outer loop, which determines the position, expansion and direction of a partial model, and of an inner loop, which optimizes the parameters of a partial model:

1. Beginning with a starting model: the starting model can be either global and comprise all data or a simple partial model (as described further below)
2. Calculating a next partial model: finding the data point with the poorest output value or prediction error. The position of this data point determines the location of the next partial model. Determining the direction and expansion of the new model so that statistical criteria with the measured data being in their range of validity are observed. This method will be described in more detail further below.
3. Calculation of the partial model parameters and of the associated statistical parameters that are needed for calculating the confidence intervals.
4. Correspondence test: the performance criteria $R^2$ and $R^2_{pred}$ for the net output are calculated. According to one principal characteristic of the present method according to the invention, the algorithm stops when the limit value is reached or exceeded. This happens too when no further improvement can be achieved. Otherwise the algorithm continues with step 2. Especially when the training data come with strong measurement noise, it is important to control the algorithm with useful regularization factors. If not, the algorithm would continue to model more and more smaller partial models in order to further improve the overall quality. In our case, this is avoided with the calculation of confidence intervals, as will also be described in more detail further below.

After the algorithm has finished forming new models, each partial model is subjected to a final check regarding its contribution to the total output value. If it turns out that a model only supplies a minimal contribution because it has been largely replaced by other models, a preferred variant of the present method provides that this model is once again removed from the overall model.

Each partial model comprises roughly two parts: its weighting function $\Phi(u)$ and its model parameters $\theta$. The output $\hat{y}_i$ of a partial model at a point u of the input space results from:

$$\hat{y}(u) = \chi^T(u) \cdot \theta \quad (3)$$

$\chi^T(u)$ represents here a line vector with regression functions that can be arbitrarily selected. The advantage of the structure in (4) lies in the fact that $\hat{y}$ depends linearly on the parameters $\theta$. This is also the reason why the method of the smallest squares of error can be used for their calculation. Remaining is the determination of suitable regression functions for $\chi^T(u)$, which will be addressed in more detail further below.

The target function is only represented by training data that come with noise. If noise is present, it is desirable that each partial model has statistical significance. This is achieved in the following manner:

1. The selection of "center candidates" $z_i$ of a new partial model is based on the prediction error $e = y - \hat{y}$. In this instance, $\hat{y}$ is the model output of the net in its current state in which i−1 models have already been formed:

$$\hat{y}(u) = \sum_{j=1}^{i-1} \Phi_j(u) \hat{y}_j(u, \theta_j) \quad (4)$$

With a number of n data sets $u_j$ for the model training, the new center candidate is placed where the absolute value of the error is at its maximum. This selection ensures that a new partial model is placed exactly at that location where it is needed the most.

2. Subsequently, further training data are selected from the direct ambient area until a first regression model can be created. The minimum amount of data needed for this is determined by the requirement that the regression matrix must have maximum rank. Calculated are the statistical characteristic values, and a check is done to determine as to whether the starting data are within a described confidence interval with an associated confidence value $\alpha$. If this is no longer the case, the iteration stops and the algorithm continues with the calculation of the parameters of the weighting function. A value of between 90% and 99% is typically selected for the confidence value $\alpha$.

3. Further training data in the ambient area of $z_k$ are otherwise successively added, and the starting model is recalculated in the same way as well as adjusted to the data. This process is repeated for as long as at least $\alpha$% of the training data are within the confidence interval.

4. When the training data for this calculation step have been established in this way, their distribution in the input space is used to determine the configuration and expansion of the weighting function.

Figure 2:
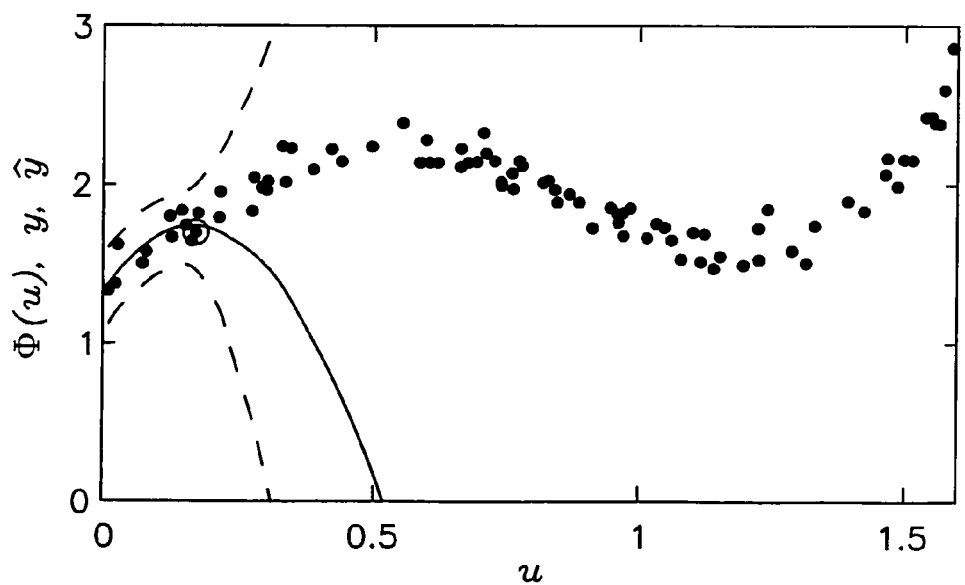
FIG. 2 shows, using the example of a non-linear input function, the "starting partial model.
Figure 3:
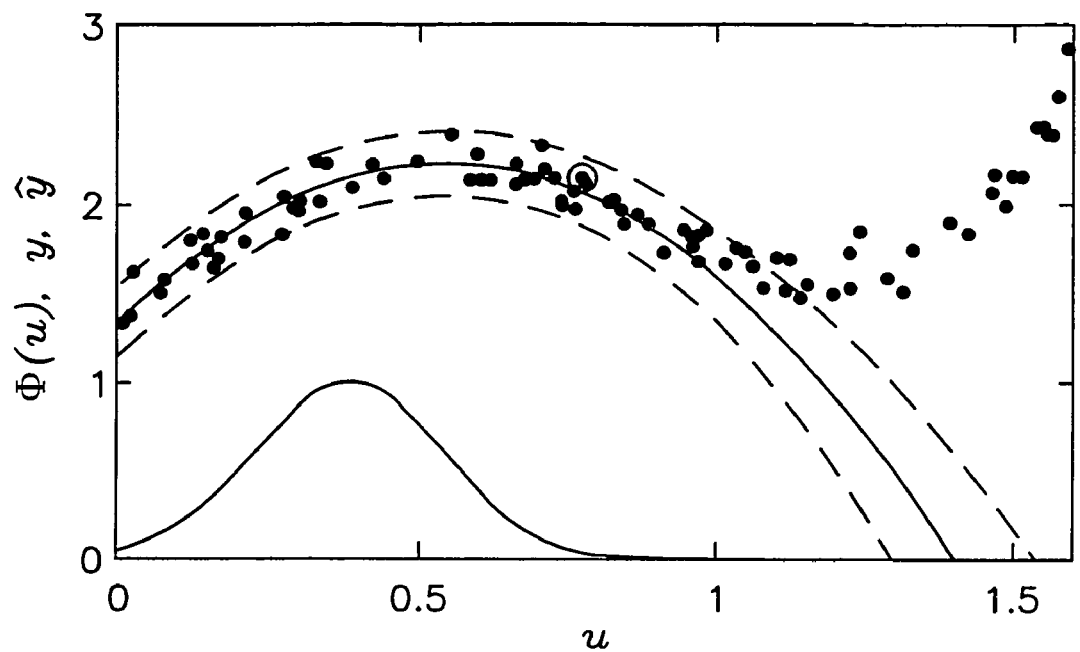
" FIG. 3 is the end situation for the example of FIG. 2.
Figure 4:
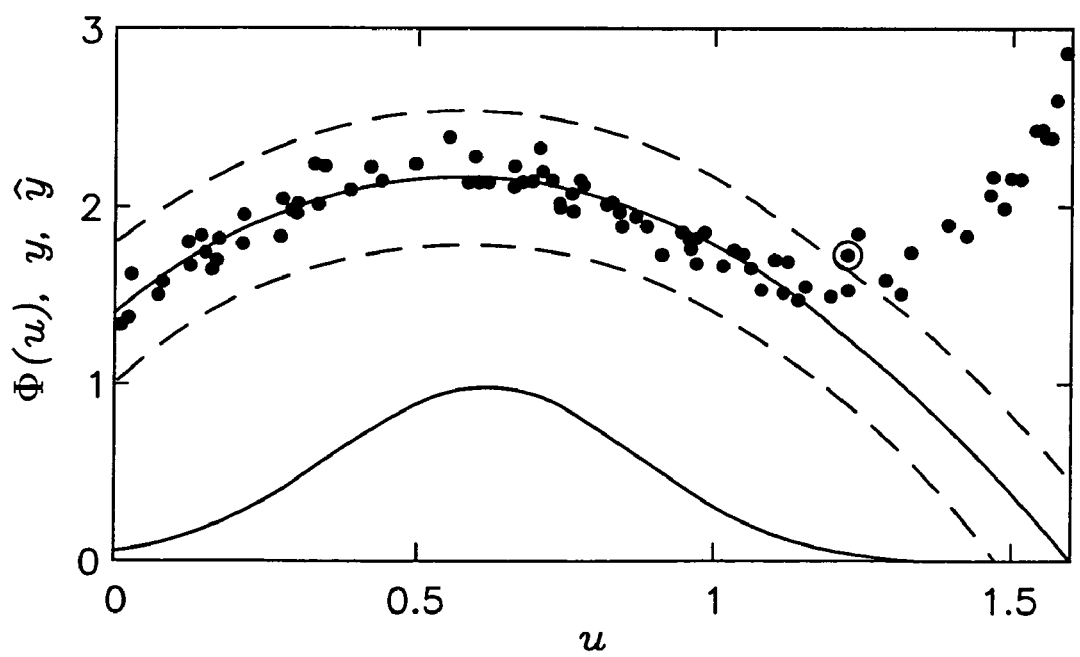
FIG. 4 shows the finished model for a higher confidence interval.

FIGS. 2 and 3 show an example of a non-linear, one-dimensional input function $f(u)$ with $\alpha = 97\%$. The training data are indicated by dots. Image 2 shows the "starting partial model": $z_i$ was selected as center candidate in this example, all data points in interval $u\in[0;1.7]$ were selected for the regression. The perforated line represents the limits of the 97% confidence interval. FIG. 3 shows the end situation: additional training data were added until finally at least 97% of the selected data were within the limits of the 97% confidence interval. The resulting weighting function, that was added to the image for a better clarity, ranges from 0.1 to 0.8 and has its maximum at 0.4. FIG. 4 shows the completed model for $\alpha = 99.99\%$. Any larger confidence value means larger confidence intervals and results as subsequent consequence in a larger expansion of the weighting function. Moreover, it can be seen in this example that the configuration of the non-linearity has much bigger influence on the model size than in FIG. 3.

Figure 5:
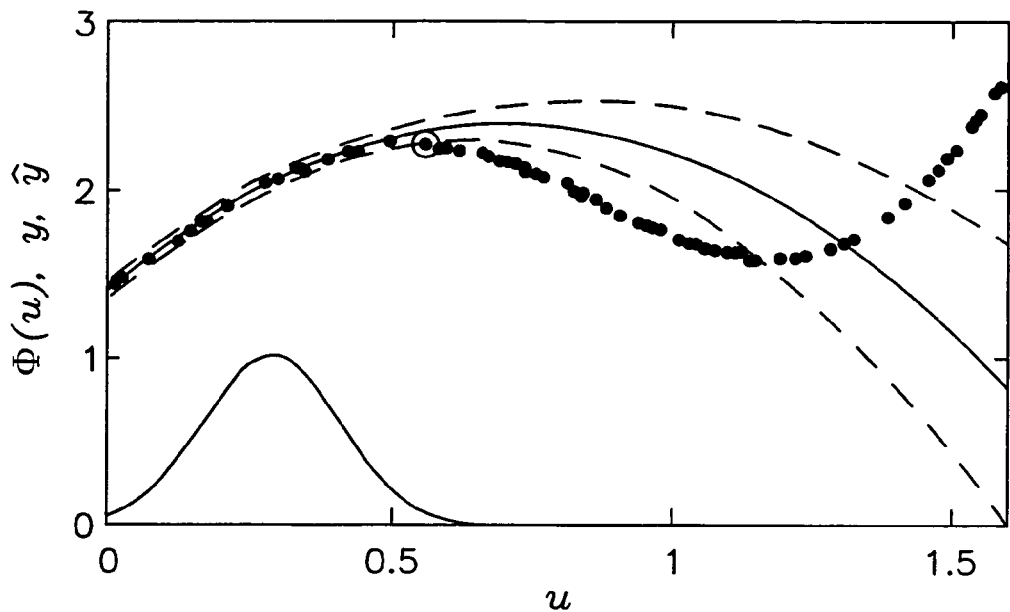
FIG. 5 contains the same function but with drastically reduced noise.

FIG. 5 contains the same function $f(x)$, but the influence of the measuring noise was drastically reduced. Even though the confidence value is still at 99.99%, the weighting function is now significantly smaller. These examples clearly show that the confidence value constitutes an excellent regularization parameter that automatically adjusts the partial model to the measurement noise of training data and to the regression factors.

In accordance with a preferred variant of the method, it is envisioned that the structure of the weighting function $\Phi_i$ is selected as follows:

$$\Phi_i(u) = \exp(-[(u-z_i)^T A_i(u-z_i)]^{K_i}) \cdot \prod_{k=i+1}^{m} (1 - \Phi_k(u)) \quad (5)$$

The vector $z_i$ contains the position of the partial model center and orientation as well as expansion of the weighting function in the input space. With the assistance of a configuration factor, it is possible to determine the flatness of the weighting function.

Figure 6A:
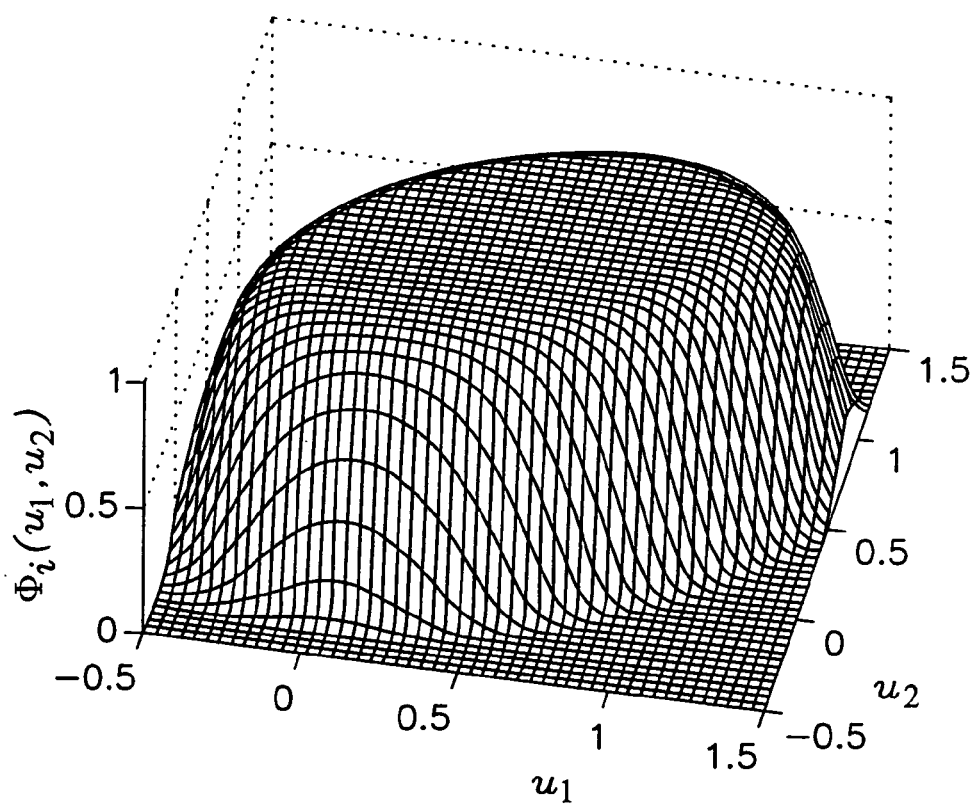
FIG. 6a is a depiction of an original ellipsoid weighting function for a two-dimensional input space.
Figure 6B:
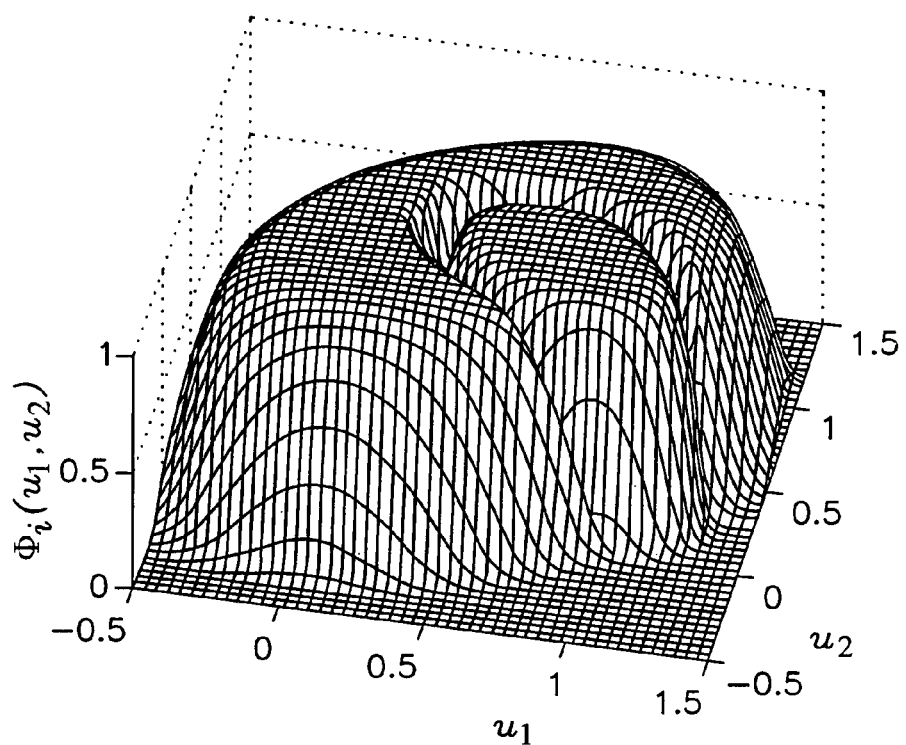
FIG. 6b shows a further weighting function representing a small sectioned area of the original weighting function.

The structure of equation (5) shows that each weighting function is initially a radial-symmetrical function in the n-dimensional space of the operating points and/or training data whose iso-curve in this n-dimensional space is a closed geometrical construct, preferably a hyper-ellipsoid. For the example of a two-dimensional operating point space as demonstrated in FIG. 6, the preferred form is an exponential function with ellipsoid contours. The product in (5) cuts out all subsequent weighting functions from the original function (refer to FIG. 6). This process has the following advantage: all subsequent partial models are placed in those areas in the input space where the previous model has been inadequate. Equation (5) ensures that the new partial model is dominant in these areas. FIG. 6 depicts this situation for a two-dimensional input space where a small area is cut out from an original ellipsoid weighting function. Consequently, only to be determined from the selected training data, in the manner as described above, are the non-linear parameters of the weighting function. $U_{sel}$ is assumed to be a matrix that contains all these data areas including the center candidate, i.e. each line of $U_{sel}$ includes the coordinate vector $u_i$ of a selected data point. Correspondingly, according to a preferred variant of the method, the actual center point is obtained by forming the center of mass of the data in $U_{sel}$.

$$z_i = \text{mean}(U_{sel}) \quad (6)$$

and whereby mean (') represents the mean value over each column.

The matrix $A_i$ is calculated by $$A_i = \gamma \cdot [cov(U_{sel})]^{-1} \quad (7)$$

and $cov(U_{sel})$ designates the empirical covariance matrix. This process is already used as early as, for example, the design of "ellipsoid basis function nets."

The principle orientation of new weighting function is therefore defined by $[cov(U_{sel})]^{-1}$, its expansion in the input space is controlled by $\gamma$. $\gamma$ is selected in this context in such a way that $\Phi_i$ continues to be 0.9 at any data point in $U_{sel}$ that is the furthest away from the new center $z_i$. This way, it is ensured that in fact a sufficient number of data points is available for the parameter estimation.

But aside from $\alpha$, $\gamma$ and k also serve as regularization factors for this model creation algorithm. The larger the chosen k, the smaller is the overlap of the individual partial models with each other. This is why k directly controls the "locality" of the models. The factor $\gamma$ is directly dependent on the selection of k and must only ensure that the "smallest square of error problem," as referred to previously, is well conditioned. Consequently, the confidence values a and k are used for the parameterization of the training algorithm.

Figure 7:
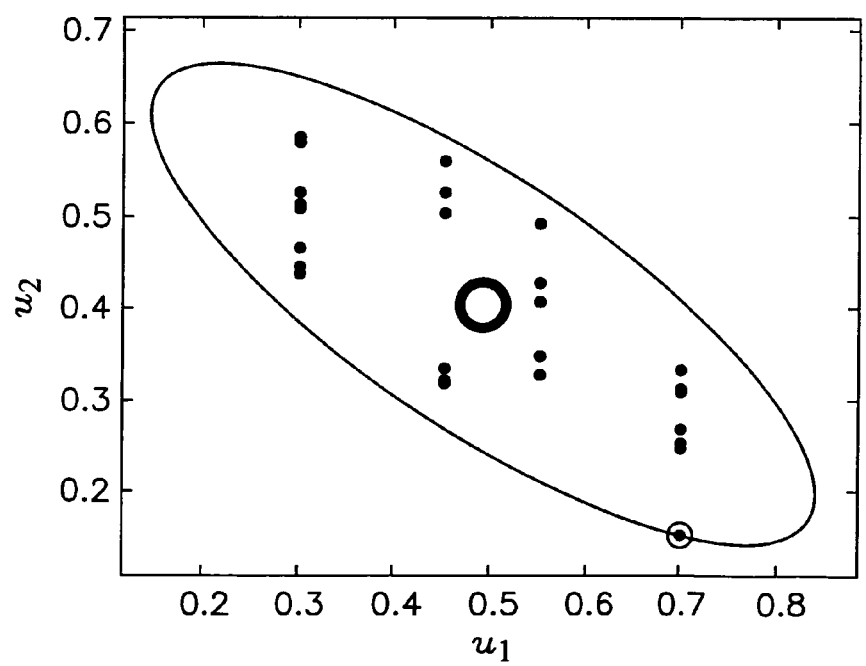
FIG. 7 shows an example for the placement and orientation of a weighting function over the input space.

FIG. 7 demonstrates this situation: a quantity of measured data distributed in space (represented by dots) in a two-dimensional input space is enclosed by $U_{sel}$. The vector from the center to the remotest point (encircled) is designated as $d_{max}$. According to a preferred variant of the method, the factor $\gamma$ results for $$\gamma = \frac{\sqrt[k]{-\ln(0.9)}}{d_{max}^T [cov(U_{sel})]^{-1} d_{max}} \quad (8)$$

The ellipse in FIG. 7, as a special two-dimensional example of an iso-curve of the weighting function, characterizes the "0.9 height line" of the resulting weighting function for (5) without taking into account further subsequent weighting functions. The weighting function is apparently adjusted to the data in a way that is very efficient in that its main axes are not necessarily parallel relative to the axes of the input space of the operating points of the system but can, in principle, have any orientation. The algorithm is not dependent on a favorable selection of the division parameters, but it is able to form models that match the available data very well.

As mentioned earlier, the output of each partial model is calculated by the regression model (3). Still to be determined are suitable regression functions $x^T(u)$. In general, there is no optimal solution that matches all non-linear problems. This is why the assumption is made that the non-linear function $f(u)$: $R^q \rightarrow R$, which is to be approximated, is at least twice continually differentiable at each point $u \in U$, and whereby U stands for the defining space in which $f(u)$ is to be approximated. If the above assumption is true, $f(u)$ can be developed into a Taylor's series at each point $u \in U$. If the regression functions are selected as elements of a cut-off Taylor's series in $R^q$, $\theta(u)$ can be approximated as well as desired in the environment of $u_i$ if the partial model is small enough. Depending on the local complexity of $f(u)$, in areas of major variability of $f(u)$, this would result in a multitude of partial models; while in few larger partial models in areas where $f(u)$ is relatively flat. Aside from the residual error of the Taylor's series, the algorithm must also address errors due to measuring noise, which means that the actual size of each partial model is influenced by both errors. In the present application, the regression functions are selected as square polynomials:

$$\hat{y}_i(u) = c_i + u^T a_i + u^T B_i u. \quad (9)$$

In the present instance, $c_i$ is a constant offset, $a_i$ designates a vector with linear parameters and $B_i$ is a lower triangle matrix that contains the parameters of the square term. Finally obtained are $(q+1)(q+2)/2$ independent regression functions, with q representing the dimension of the input space.

X is assumed to be a matrix with the regression vectors of all n training data sets:

$$X = \begin{pmatrix} x^T(u_1) \\ x^T(u_2) \\ \vdots \\ x^T(u_n) \end{pmatrix} \quad (10)$$

Moreover, $Q_i$ is assumed to be a diagonal matrix comprised of the $\Phi_i$, evaluated at the training data points:

$$Q_i = \begin{pmatrix} \Phi_i(u_1) & 0 & \cdots & 0 \\ 0 & \Phi_i(u_2) & \cdots & 0 \\ \vdots & \vdots & \ddots & \vdots \\ 0 & 0 & \cdots & \Phi_i(u_n) \end{pmatrix} \quad (11)$$

If y is a vector with the data of the target function at the data points, local parameter vector no. i if given by:

$$\theta_i = (X^T Q_i X)^{-1} X^T Q_i y. \quad (12)$$

For the calculation of the statistic for the partial models it is assumed that the training data can be described locally by the following regression model:

$$y = X\beta + e \quad (13)$$

In this instance, X comprises the same regression functions (or a part thereof) as x(u) in the partial models, e is a vector exposed to white noise, with the standard deviation $\sigma_n$, and $\beta$ is the vector of the parameters to be identified.

This assumption is, in general, very restrictive; but, nevertheless, it does not mean any loss of general validity for the described construction algorithm because the configuration and expansion of each partial model is formed in connection with the model statistics.

If y from (13) is substituted in (12) one arrives at:

$$\theta_i = (X^T Q_i jX)^{-1} X^T Q_i (X\beta + e) = \beta + (X^T Q_i X)^{-1} X^T Q_i e \quad (14)$$

For the desired value $\theta$ one arrives at:

$$E\{\theta_i\} = \beta + E\{(X^T Q_i X)^{-1} X^T Q_j e\}$$

$$E\{\theta_i\} = \beta + (X^T Q_i X)^{-1} X^T Q_j \cdot E\{e\} = \beta$$

One can see that $\theta_i$ behaves as anticipated. With this result, it is possible to formulate the parameter deviation as follows:

$$cov(\theta) := E\{\delta\delta^T\} \text{ with } \delta = \theta - \beta. \quad (15)$$

By substituting from (14) in $E\{\delta\delta^T\}$ one arrives at:

$$E\{\delta\delta^T\} = E\{[X^T j_i X)^{-1} X^T Q_i e] \cdot [e^T Q_j X (X^T Q_i X)^{-1}]\}$$

With the following substitution $\theta_Q = (X^T Q_i X)^{-1}$ one arrives at:

$$E\{\delta\delta^T\} = \theta_Q X^T Q_i \cdot E\{ee^T\} \cdot Q_i X \theta_Q \quad (16)$$

Since there is no relation between the measuring noise at different training points, it applies that $E\{\delta\delta^T\} = \sigma_n^2 I$. This is why the covariance of the parameter vector finally becomes:

$$cov(\theta) := \sigma_n^2 \theta_Q X^T Q_i^2 X \theta_Q. \quad (17)$$

It must be noted that the noise covariance $\sigma_n^2$ is unknown in most cases, which is why it must be substituted with the empirical covariance calculated on the basis of the available data. It is assumed that or $\sigma_n^2$ is constant in all areas of the input space. But in some practical situations it happens, nevertheless, that the noise covariance varies in the input space. If the spatial change rate is small in comparison to the size of the model, (17) continues to be valid. The global model statistics as well can in such a case also be calculated with the changes of $\sigma_n^2$.

The dispersion of the partial model output $\hat{y}_i(u_i)$ is then calculated as follows:

$$E\{(y_i - \hat{y}_i)(y_i - \hat{y}_i)^T\} = E\{[\chi(u_i)\delta - e][\chi(u_i)\delta - e]^T\} =$$
$$E\{\chi(u_i)\delta\delta^T\chi(u_i)^T - \chi(u_i)\delta e - e\delta^T\chi(u_i)^T + e^2\}$$

By substituting $E\{\delta\delta^T\}$ from (17) and taking into consideration that e is independent of $\delta$ for those data point that were not used for the parameter estimation, one arrives at:

$$cov(\hat{y}) = \chi(u_i)\theta_Q X^T Q_i^2 X^T \theta_Q \chi(u_i)^T \sigma_n^2 \sigma_n^2 \quad (18)$$

This results in:

$$cov(\hat{y}_i(u)) = \sigma_n^2[1 + \chi(u_i)\theta_Q X^T Q_i^2 X \theta_Q \chi(u_i)]$$

For those data points ui that were used for training, e is independent of $\delta$, and (19) is substituted with a similar function that will not be explained here because it would go too far beyond the present scope. The prediction interval at a point u in the input space with a significance level of $\alpha$ is given by:

$$|\hat{y}(u) = y(u)|\alpha = \sigma_n \sqrt{1 + \chi(u)\theta_Q X^T Q_j^2 X \theta_Q \chi(u)} \times t_1 - \alpha/2 \quad (20)$$

As shown, the t-statistics for a significance level of $\alpha$-% must be calculated with the degrees of freedom that depend both on the number of used training data points as well as on the number or regressors.

Aside from the creation of partial models, for the overall model creation, the interaction of all partial models must also be taken into account. This relates both to the combining of the partial model outputs as well as for the total model statistics, global prediction intervals and efficient calculation paths for the $R^2$ and $R^2_{pred}$ statistics from (1) and (2).

As shown in FIG. 1, the total model output is comprised of a weighted sum of all partial model outputs. The weights depend on the position of u in the input space and are defined by the weighting function $\Phi$. As mentioned before, the design parameters of the weighting function, specifically $k_1$, define the degree of overlap of the individual models and define, therefore, also the degree of regularization of the model function. Clearly, major overlap generally leads to a more strongly regularized function adjustment.

Therefore, using the net output, it is possible to calculate the degree of certainty as usual. $R^2_{pred}$ can also be calculated by way of definition (2).

$$R^2_{pred} = 1 - \frac{\sum_{i=1}^{n} \left(\frac{\hat{y}_i - y_i}{1 - q_i h_i}\right)^2}{\sum_{i=1}^{n} (y_i - \tilde{y})^2}$$

The calculation of the confidence intervals on the global level is comprised of two steps:
1. Calculation of the covariance
2. Determination of the effective degree of freedom on the global level for the t statistics Step one is not very complicated because the global model output is a linear combination of the partial model as shown in FIG. 1:

$$\text{cov}(\hat{y}(u)) = \sum_{i=1}^{m} \Phi_i^2(u) \text{cov}(\hat{y}_i(u)) \quad (21)$$

In the above formula, cov($\hat{y}_i$(u)) originates from (19). It is remarkable that $\sigma_n^2$ is not directly contained in (21). The covariance cov($\hat{y}_i$(u)) of each partial model depends on the model structure and on local measuring noise. This means that (21) can also be used if the measuring noise differs from one partial model to another, provided cov($\hat{y}_i$(u)) was calculated correctly. To be noted is moreover the fact that, in principle, the individual local partial models are not statistically independent. But, due to the minimal degree of overlap of the partial models in the present application, this situation does not play a role that is worth mentioning.

For the overall model, the output at the training data points is given by:

$$\hat{y} = Sy \text{ with } S = \sum_{i=1}^{m} S_i \text{ and } S_i = Q_i X (X^T Q_i X)^{-1} X^T Q_i$$

The matrix S transforms therefore the actual training data points y into their modeled counterparts $\hat{y}$ and is thus called the "smoothing matrix." The number of the effective parameters $n_{eff,i}$ of the partial models results from:

$$n_{eff,i} = \text{trace}(S_i^T S_i) \quad (22)$$

and resulting, as described previously, is the total number of effective parameters for:

$$n_{eff} = \sum_{i=0}^{m} n_{eff,i} \quad (23)$$

The remaining degrees of freedom result then for DOF=N−$n_{eff}$ and represent the basis for the calculation of the t-statistic. Remarkably, $n_{eff}$ from (23) does not necessarily have to be an integer value. During the tree modeling process, it happens once in a while that the weighting function of a partial model is gradually cut away by further weighting functions until in the end there is nothing left that the former has contributed to the quality of the model. In the current application, these partial models are ultimately removed, when their $n_{eff,i}$ falls below 1.

The first example for the above process is easy to follow and is intended to demonstrate the possibilities that are inherent in this method. Viewing the non-linear function $f:R\rightarrow R$ in an one-dimensional input space in which the iso-curve of the weighting function represents an interval:

$$f(u)=0.1u+\sin(1.2u^2)+0.05u^2+n(u)$$

In this instance, n(u) is a non-correlated noise with a covariance of 0.05:

$$E\{n(u)n(u+\tau)\}=\delta(\tau)0.05^2$$

Figure 8:
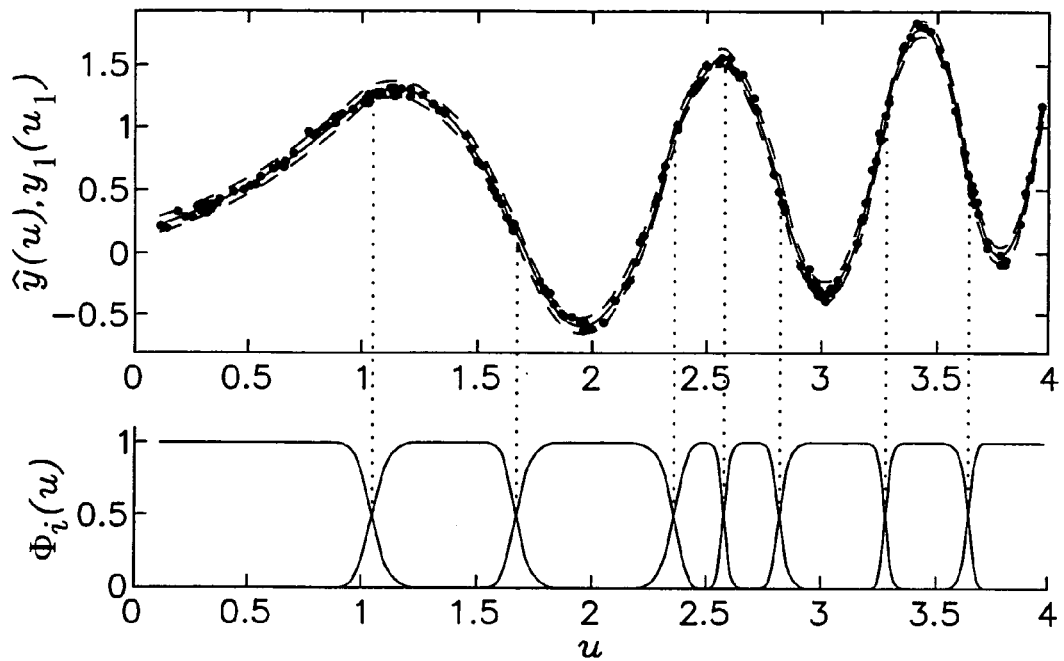
FIG. 8 is an example of a non-linear function over an one-dimensional input space.

The net was trained with 230 data points from the interval u∈[0;4]. Eight partial models were ultimately created, shown in FIG. 8. From the weighting functions it can be detected that the partial models in the close ambient areas of the inflection points of $f$(u) are running into each other. Based on the strong noise, the algorithm decides to model each convex and concave section of $f$(u) with a partial model, with the exception of section u∈[2.36;2.81] where several smaller partial models were created. The net was optimized to $R^2_{pred}$, the final value was $R^2_{pred}$=0.99 with $R^2$=0.9917. The calculated prediction values are visibly very precise. In fact, 93% of 200 verification data points from FIG. 8 are within the 95% prediction interval.

A second example models the real measured data of a combustion engine. Specifically, the air efficiency $A_e$ is to be modeled as a function of engine speed n, valve lift $L_v$ and intake valve closing time $T_c$:

$$A_e=f(n,L_v,T_c)$$

Figure 9:
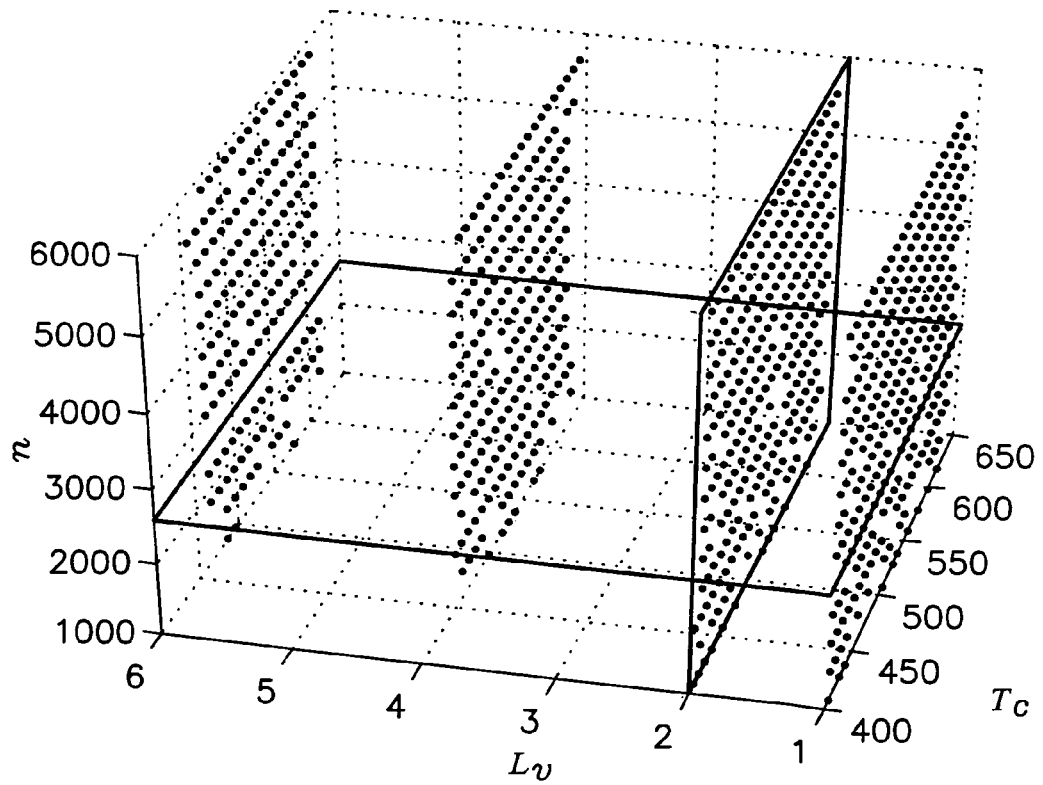
FIG. 9 shows the three-dimensional input space with actual measured data of a combustion engine as training data for the creation of a model.
Figure 10:
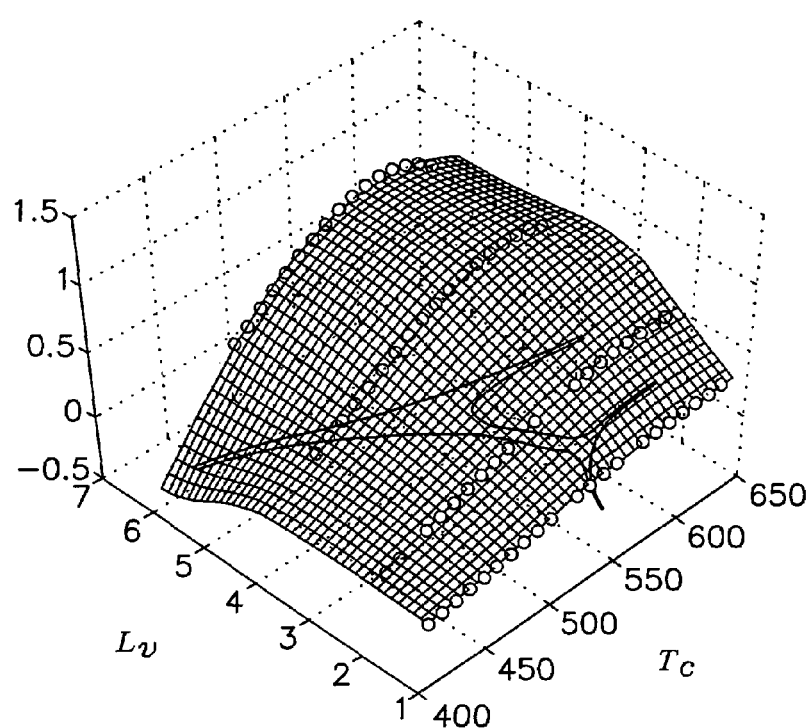
FIG. 10 is the representation of a model for a certain constant engine speed.
Figure 11:
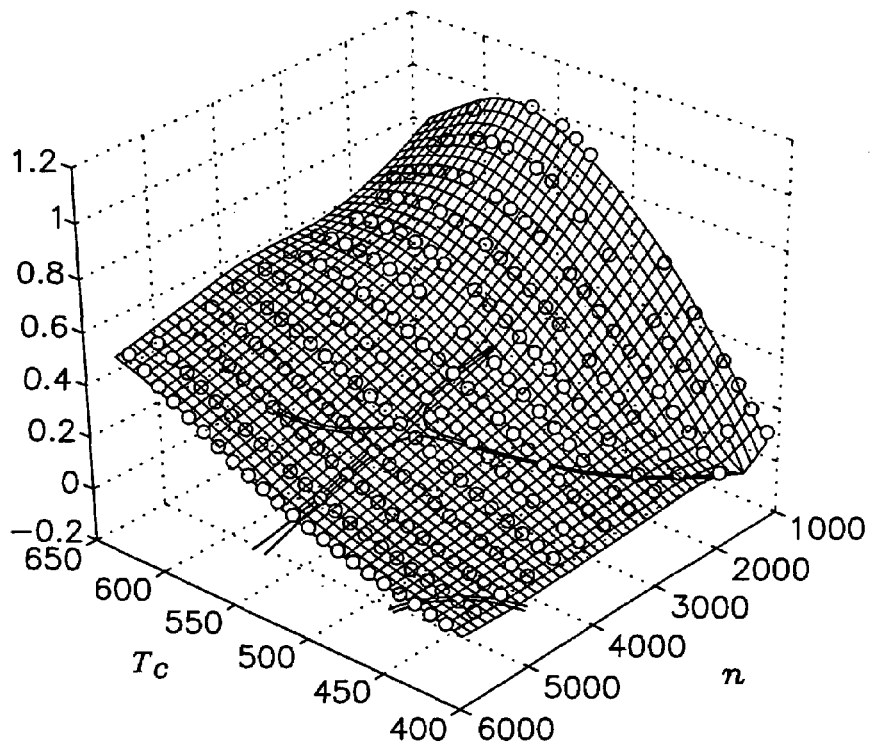
FIG. 11 is the model for a certain valve lift.
Figure 12:
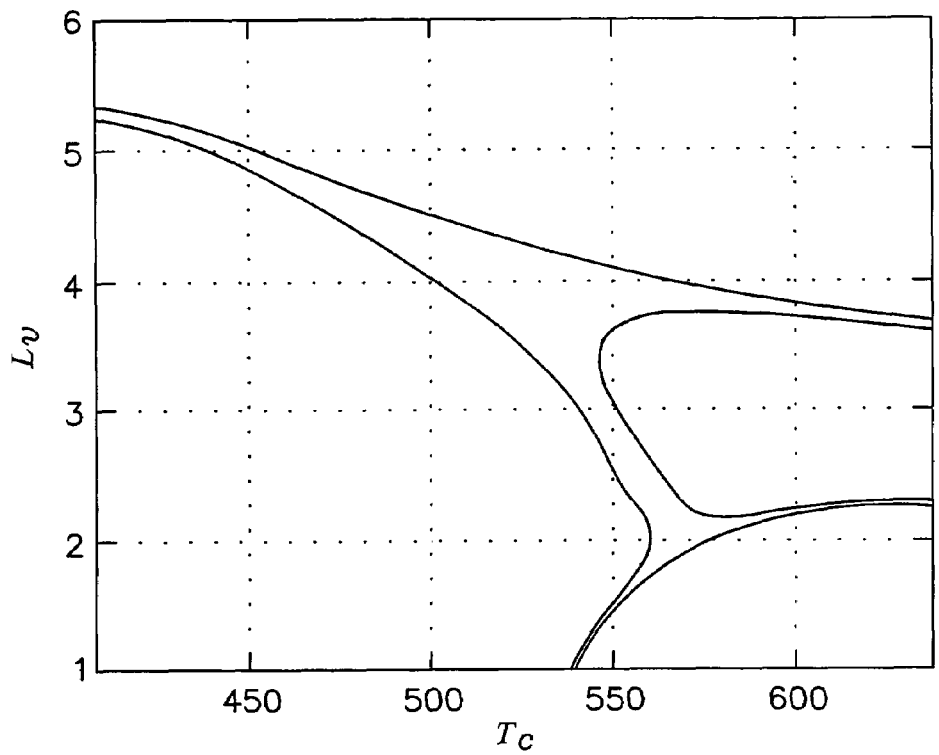
FIGS. 12 and 13 demonstrate the distribution of the weighting functions for the steps depicted in FIGS. 10 and 11.
Figure 13:
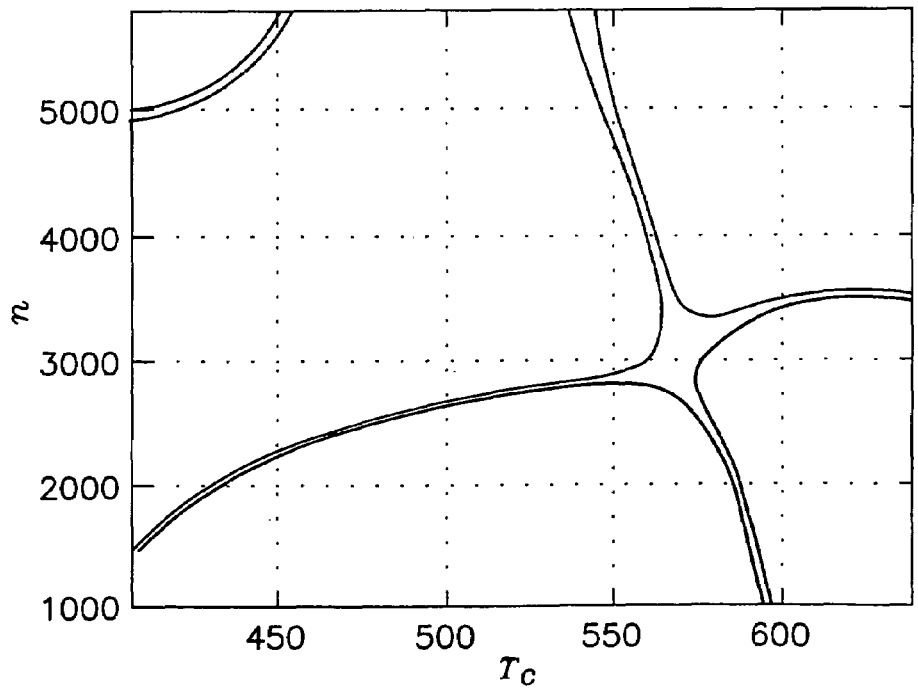

FIG. 9 shows the three-dimensional input space U with the available training data. The resulting net models the function $f: R^3\rightarrow R$ with an accuracy of $R^2$=0.9941 and $R^2_{pred}$=0.9931 for seven partial models. In comparison, using the same square partial model structure, the LOLIMOT algorithm needs 30 partial models to achieve the same accuracy, provided the discontinuation criterium was suitably defined. FIG. 9 shows, moreover, two sections: one for n=2800 and another for $L_v$=2. FIGS. 10 and 11 depict the net output for these two sections together with the associated training data points. The color legend designates the 95% confidence interval (in percent of 1). It is apparent that the confidence interval has a very even configuration, having only small deviations at the outer limits of the area to be measured. FIGS. 12 and 13 show, in addition, the areas of the weighting functions for these sections. It should be noted that not all weighting functions are active at n=2800 and $L_v$=2.

Figure 14:
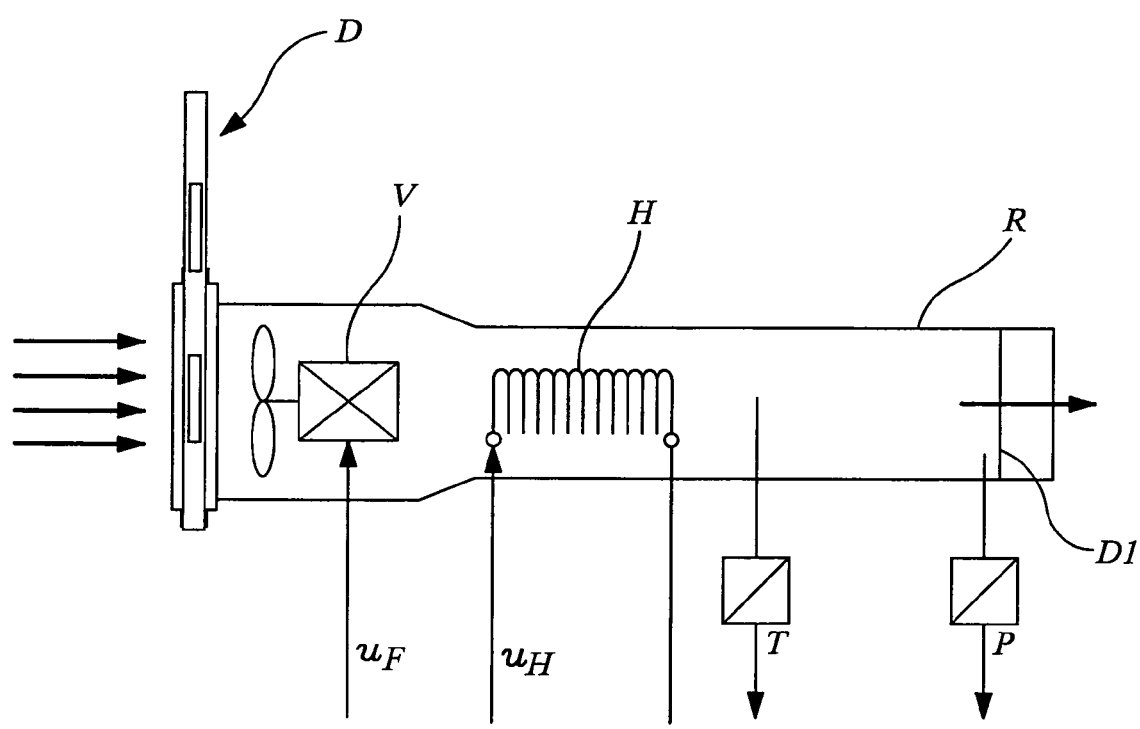
FIG. 14 is a schematic depiction of an experimental setup for air flow control and temperature control.

The experimental laboratory setup "Air Flow Control and Temperature Control" shown in FIG. 14 contains the technical realizations of two different controls (air flow control of the first order, temperature control of higher order). An axial fan V, arranged behind a throttle D, generates an air flow inside a polypropylene tube R. A heater element H generates heat inside this flow. Two measurements are available: the air volume of the flow is measured by pressure difference sensor P that compares the pressure before the nozzle D1 with the constant ambient pressure. The other sensor T measures air temperature T. The two sensors P, T (industry standard) are mounted in certain positions on the tube R.

It lies in the nature of the process that the strongest non-linearity occurs between fan voltage $u_F$ and measured temperature T.

The dynamic identification of this installation is effected with assistance of the function $$\dot{T}=g(T,u_F,P)$$

Figure 15:
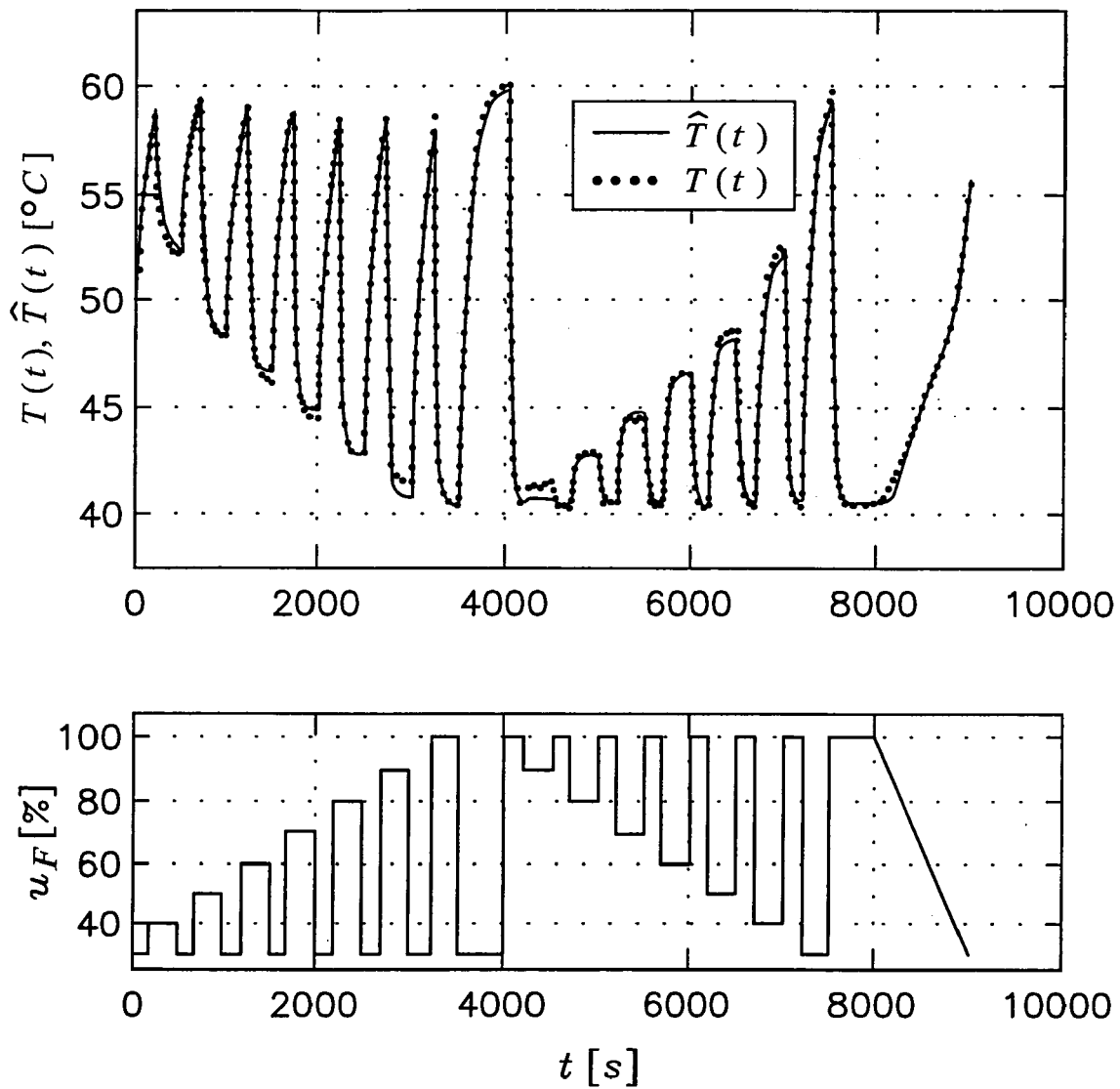
FIG. 15 shows the forward signal and the measured output together with the model output for the temperature change.

Since a measurement of $\dot{T}$ is not directly available, the central differential quotient of T(t) was used as target function for the net training. Triggering of the installation was selected in such a way that the entire input space is traversed. FIG. 15 shows the forward signal $u_F$(t) and the measured output T(t) together with the model output $\tilde{T}$(t). The validation signal $\tilde{T}$(t) in the present example was generated by the numerical solution of the following differential equation:

$$\dot{\tilde{T}}(t)=\breve{g}(\tilde{T},u_{F,m},P_m)$$

Herein, $\breve{g}$ represents the non-linear function identified by the net, and $u_{F,m}$, $P_m$ represents the measured fan voltage or the pressure.

Figure 16:
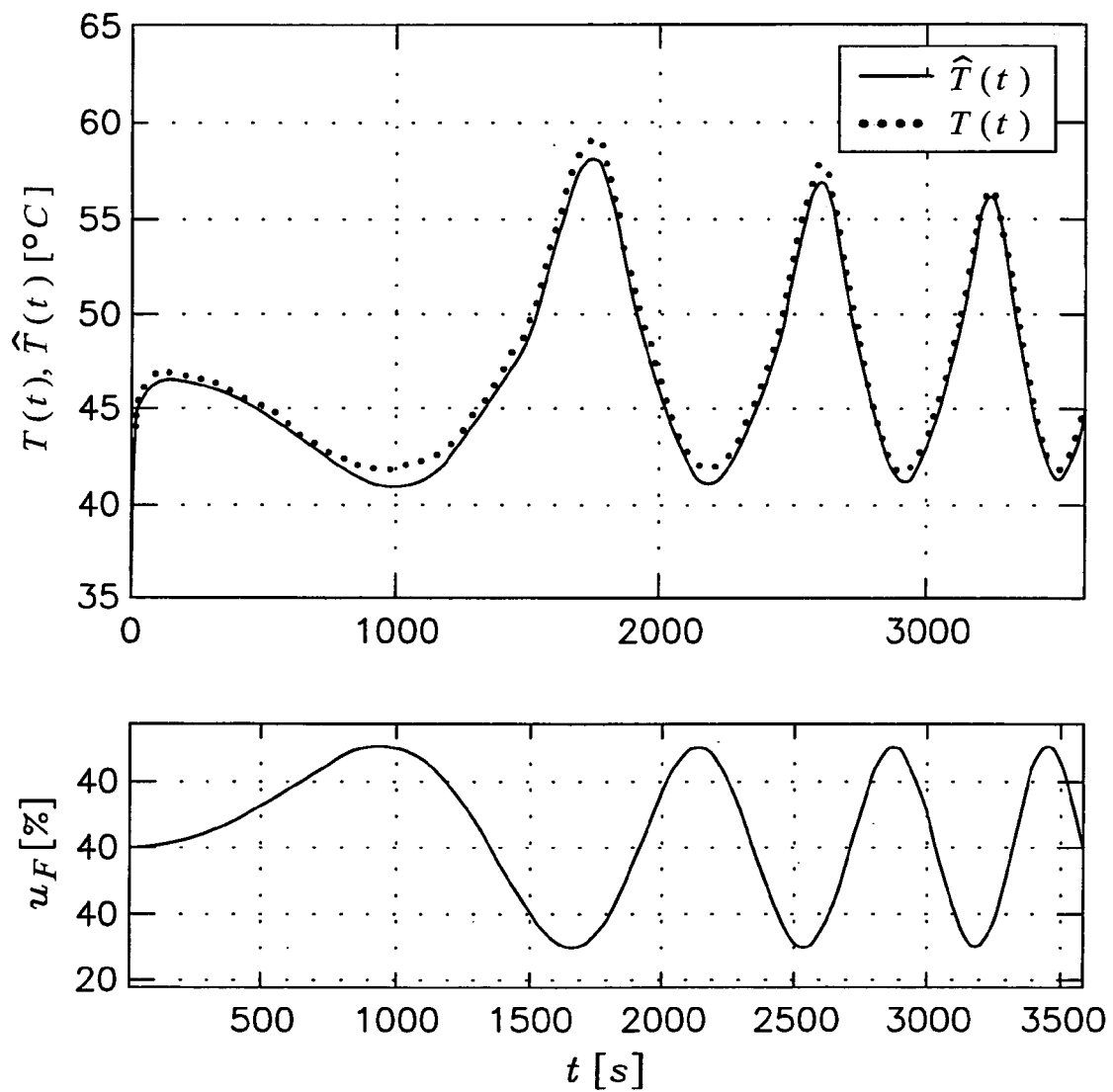
FIG. 16 shows the model output as a function of a special validation signal in comparison to the measured data from the actual installation of FIG. 14.

FIG. 16 shows the model output T relative to a validation signal, $u_F(t)=60+35\cdot\sin(10^{-6}\cdot t^2)$ compared to the measured data from the actual installation. The non-linearity of the process is very clearly visible in the course of T(t). Also visible is the fact, moreover, that the maximum error of the identified model is only 1° C.

The weighting functions of the generated models are exactly adjusted to the available data. This is achieved by using any desired orientation and expansion of the weighting function of each partial model in the input space. Each weighting function is positioned in the area of the input space where the model error is still large enough to serve as optimal basis for further model improvement. The orientation and expansion of each partial model are adjusted to the available measured data and measuring noise in such a way that defining the local regression parameters constitutes a benevolent problem. The regularization of the model can be controlled with form factor k and confidence value α. The form factor determines the overlap between the individual partial models, and the confidence value determines the size of the partial models.

The method according to the invention provides the user with accurate model statistics that help with assessing the reliability of the viewed model. The shown applications—synthetic example with noisy data and real measured data of a combustion engine with 3-dimensional input space and dynamic air flow control and temperature control—illustrate that the method according to the invention can achieve excellent results with a relative minimal number of partial models.

The invention claimed is:

1. A modeling method for a control variable of a machine, by establishing a non-linear, stationary or dynamic model over an entire spectrum of all operating points of the machine, whereby the control variable is dependent on a set of system parameters, comprising the steps of:
   a) determining by way of measurement values of the control variable for a group of operating points out of the entire spectrum of operating points of the machine,
   b) determining an output quantity at the group of operating points using a partial model function modeling the machine behavior,
   c) adding at any operating point the output quantities of each partial model function in a weighted fashion to an associated weighting function to arrive at a total output quantity for the control variable of the engine for the respective operating point,
   d) determining for all operating points with the control variable determined by measurement a difference between total output quantity and value of the control value arrived at by measurement,
   e) choosing a further model function and using it with a further associated weighting function in such areas of operating points where an absolute value of this difference is above a preset value, such that an absolute value of the difference remains below the preset value, and
   f) repeating the steps of determining the difference between total output quantity of associated partial model functions and a value of the control variable of the engine at this operating point, that is evaluated by measurement, and of applying of a further model function and further weighting function as many times as needed until a statistically evaluated prediction quality of the model over the entire spectrum of all operating points of the machine has reached a desired value.

2. A method as claimed in claim 1, wherein a most recent step is undone and run-through is stopped when the statistically evaluated prediction quality should deteriorate again with the most recent step.

3. A method as claimed in claim 1, wherein each weighting function is a radial-symmetrical function in the n-dimensional space of the operating points, and whereby iso-curves of the weighting function represent a closed geometrical construct in the spectrum of the operating points, and each iso-curve with weighting values of a defined limit of the maximum value of the weighting function, geometrically encloses a group of operating points where the values of the control variable has been determined by way of measurement.

4. A method as claimed in claim 3 wherein the one iso-curve of the weighting function is a hyper-ellipsoid in the n-dimensional space whose main axes in the space of the operating points have, in principle, any orientation in relation to the system of coordinates.

5. A method as claimed in claim 3, wherein the weighting function is an exponential function of at least one input quantity at the respective operating point.

6. A method as claimed in claim 3, wherein a first weighting function is envisioned whose iso-curve of a defined weighted value geometrically encloses all operating points where the values of the control variable has been determined by way of measurement.

7. A method as claimed in claim 6, wherein, on the basis of the operating point that has the largest absolute value of the difference between total output quantity of the model and the actual value of the control variable, further points are established for the next partial model in whose center of mass the further weighting function is placed.

8. A method as claimed in claim 3, wherein the number of operating points where the values of the control variable has been determined by way of measurement within the iso-curve of a defined weighted value of the weighting function is larger than the number or regressors.

9. A method as claimed in claim 8, wherein, if the number of regressors within the closed iso-curve of a defined weighted value of the weighting function drops below the number of input quantities that is multiplied by a factor below the number multiplied by a factor 1.05, this model and the associated weighting function are removed from the overall model.

10. A method as claimed in claim 1, wherein an error of the model function within the defined iso-curves of each weighting function is smaller than 10%.

* * * * *